US010604027B2

(12) United States Patent
Dow et al.

(10) Patent No.: US 10,604,027 B2
(45) Date of Patent: Mar. 31, 2020

(54) ELECTRIC VEHICLE AUTOMATIC CHARGING STATION (71) Applicant: International Business Machines Corporation, Armonk, NY (US)

(72) Inventors: Eli M. Dow, Wappingers Falls, NY (US); James P. Gilchrist, Milford, CT (US); Brendan C. Lewis, Poughkeepsie, NY (US); Khaalid P. McMillan, Wappingers Falls, NY (US); Christopher J. Nycz, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 15/150,500

(22) Filed: May 10, 2016

(65) Prior Publication Data

US 2017/0106762 A1   Apr. 20, 2017

Related U.S. Application Data (63) Continuation of application No. 14/886,125, filed on Oct. 19, 2015, now Pat. No. 10,279,696.

(51) Int. Cl.
*B60L 53/51* (2019.01)
*H02J 7/00* (2006.01)
(Continued)

(52) U.S. Cl.
CPC .............. *B60L 53/51* (2019.02); *B60L 53/16* (2019.02); *B60L 53/305* (2019.02); *B60L 53/36* (2019.02);
(Continued)

(58) Field of Classification Search
CPC ... Y02T 90/14; Y02T 90/121; Y02T 10/7055; B60L 11/1835; B60L 11/1816;
(Continued)

(56) References Cited

U.S. PATENT DOCUMENTS 4,229,061 A * 10/1980 Majors ............... H01R 13/2421
439/217
4,966,556 A * 10/1990 Reymond .............. H01R 12/58
29/882
(Continued)

FOREIGN PATENT DOCUMENTS

CN  203503843 U  3/2014
CN  203503929 U  3/2014
(Continued)

OTHER PUBLICATIONS

Pending U.S. Appl. No. 14/886,125, filed Oct. 19, 2015, entitled: "Electric Vehicle Automatic Charging Station", 32 pages.
(Continued)

*Primary Examiner* — David V Henze-Gongola
*Assistant Examiner* — Tarikh Kanem Rankine
(74) *Attorney, Agent, or Firm* — Michael O'Keefe (57) ABSTRACT A structure is provided. The structure may include an alignment mechanism used to align an electric vehicle in a parking lane of an electric vehicle charging station, and a coupler assembly including an arm and a charging coupler located in the parking lane and positioned beneath the electric vehicle, the charging coupler is positioned at one end of the arm, and is moveable in a vertical direction relative to the parking lane, and another end of the arm is pivotally mounted in the parking lane, where the charging coupler includes one or more electrical contacts in a shape of a right conical frustum extending from the charging coupler in the vertical direction.

5 Claims, 12 Drawing Sheets (51) Int. Cl.
*B60L 53/16* (2019.01)
*B60L 53/36* (2019.01)
*B60L 53/37* (2019.01)
*B60L 53/65* (2019.01)
*B60L 53/30* (2019.01)
*B60L 53/34* (2019.01)
*B60L 50/61* (2019.01)
*B60L 53/20* (2019.01)
*B60L 50/60* (2019.01)

(52) U.S. Cl.
CPC ............ *B60L 53/37* (2019.02); *B60L 53/65* (2019.02); *H02J 7/0021* (2013.01); *H02J 7/0027* (2013.01); *H02J 7/0045* (2013.01); *B60L 50/60* (2019.02); *B60L 50/61* (2019.02); *B60L 53/20* (2019.02); *B60L 53/34* (2019.02); *H02J 2007/0001* (2013.01); *H02J 2007/0096* (2013.01); *Y02T 10/7005* (2013.01); *Y02T 10/7055* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............ B60L 11/1824; B60L 11/1846; B60L 11/1827; B60L 2240/30; B60L 2240/28; B60L 2240/62
USPC ........................................................ 320/109
See application file for complete search history.

(56) References Cited

U.S. PATENT DOCUMENTS

| | | | |
|---|---|---|---|
| 5,462,439 A | 10/1995 | Keith | |
| 5,990,697 A | 11/1999 | Kazama | |
| 6,329,787 B1* | 12/2001 | Ito | A63F 13/12 320/114 |
| 6,619,342 B2* | 9/2003 | Graham | B60L 58/34 141/231 |
| 6,776,668 B1* | 8/2004 | Scyoc | H01R 13/2421 439/295 |
| 8,747,136 B2 | 6/2014 | Maurer et al. | |
| 9,056,555 B1* | 6/2015 | Zhou | B60L 11/1827 |
| 9,421,879 B2* | 8/2016 | Pastoor | B60L 11/1818 |
| 9,493,087 B2 | 11/2016 | Leary | |
| 9,725,002 B2 | 8/2017 | Hauptenbuchner | |
| 2001/0005645 A1 | 6/2001 | Zech et al. | |
| 2004/0085694 A1* | 5/2004 | Germagian | A45C 13/02 361/90 |
| 2005/0151506 A1* | 7/2005 | Kennedy | H01R 27/00 320/111 |
| 2008/0111519 A1 | 5/2008 | Vasilantone | |
| 2010/0013434 A1 | 1/2010 | Taylor-Haw | |
| 2010/0121588 A1* | 5/2010 | Elder | H01M 10/48 702/63 |
| 2010/0232093 A1* | 9/2010 | Kaminski | H02B 1/52 361/623 |
| 2010/0235006 A1* | 9/2010 | Brown | B60L 11/1833 700/286 |
| 2011/0066515 A1* | 3/2011 | Horvath | B60L 11/1818 705/17 |
| 2011/0254503 A1 | 10/2011 | Widmer et al. | |
| 2012/0280653 A1* | 11/2012 | Prosser | B60L 53/68 320/109 |
| 2013/0076902 A1 | 3/2013 | Gao et al. | |
| 2014/0333261 A1 | 11/2014 | Oh et al. | |
| 2015/0346288 A1* | 12/2015 | Hardy | G01R 21/133 702/58 |
| 2015/0372414 A1* | 12/2015 | Salomon | H01R 13/2421 439/587 |
| 2016/0339791 A1 | 11/2016 | Sim | |
| 2017/0166070 A1* | 6/2017 | Dunger | B60L 11/1818 |
| 2018/0236887 A1 | 8/2018 | Sarkar | |

FOREIGN PATENT DOCUMENTS

| | | |
|---|---|---|
| DE | 102011114321 A1 | 3/2013 |
| EP | 2323237 A2 | 5/2011 |
| JP | 2011150177 A | 8/2011 |
| WO | 2011063959 A1 | 6/2011 |
| WO | 2011064596 A2 | 6/2011 |
| WO | 2011079215 A2 | 6/2011 |
| WO | 2011133527 A1 | 10/2011 |

OTHER PUBLICATIONS

IBM: List of IBM Patents or Patent Applications Treated as Related (Appendix P), May 10, 2016, 2 pages.
Mell et al., "The NIST Definition of Cloud Computing," U.S. Department of Commerce, National Institute of Standards and Technology, Sep. 2011, p. 1-7, Special Publication 800-145.

* cited by examiner

ELECTRIC VEHICLE AUTOMATIC CHARGING STATION

BACKGROUND

The present invention generally relates to electric vehicles and more particularly to an electric vehicle automatic battery charging station.

An electric vehicle charging station allows charging of an electric vehicle. An electric vehicle requires recharging of a self-contained battery for continued operation. Traditional electric vehicle charging stations require manual insertion of a corded plug from the electric vehicle charging station into an outlet of the electric vehicle, followed by a wait time while the self-contained battery is charged, and then removal of the corded plug from the outlet of the electrical vehicle when charging is complete.

SUMMARY

According to one embodiment of the present invention, a structure is provided. The structure may include an alignment mechanism used to align an electric vehicle in a parking lane of an electric vehicle charging station, and a coupler assembly including an arm and a charging coupler located in the parking lane and positioned beneath the electric vehicle, the charging coupler is positioned at one end of the arm, and is moveable in a vertical direction relative to the parking lane, and another end of the arm is pivotally mounted in the parking lane, where the charging coupler includes one or more electrical contacts in a shape of a right conical frustum extending from the charging coupler in the vertical direction.

According to another embodiment, a structure is provided. The structure may include an alignment mechanism used to align an electric vehicle in a parking lane of an electric vehicle charging station, a terminal including a display and an interface and a wireless communication device, the wireless communication device detects a presence of the electric vehicle and receives vehicle information, the vehicle information includes charging parameters specific to the electric vehicle, and a coupler assembly including an arm and a charging coupler located in the parking lane and positioned beneath the electric vehicle, the charging coupler is positioned at one end of the arm, and is moveable in a vertical direction relative to the parking lane, and another end of the arm is pivotally mounted in the parking lane, where the charging coupler includes one or more electrical contacts in a shape of a right conical frustum extending from the charging coupler in the vertical direction.

According to another embodiment, a structure is provided. The structure may include an alignment mechanism used to align an electric vehicle in a parking lane of an electric vehicle charging station, a terminal including a display and an interface and a wireless communication device, the wireless communication device receives vehicle information, the vehicle information includes charging parameters specific to the electric vehicle, an electromagnetic sensor used to detect a presence of the electric vehicle in the parking lane and to activate the terminal to initiate charging of a battery in the electric vehicle and a coupler assembly including an arm and a charging coupler located in the parking lane and positioned beneath the electric vehicle, the charging coupler is positioned at one end of the arm, and is moveable in a vertical direction relative to the parking lane, and another end of the arm is pivotally mounted in the parking lane, wherein the charging coupler includes one or more electrical contacts in a shape of a right conical frustum extending from the charging coupler in the vertical direction.

BRIEF DESCRIPTION OF THE DRAWINGS

The following detailed description, given by way of example and not intended to limit the invention solely thereto, will best be appreciated in conjunction with the accompanying drawings, in which.

Elements of the figures are not necessarily to scale and are not intended to portray specific parameters of the invention. For clarity and ease of illustration, scale of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Electric vehicles consume electricity which can be generated from a wide range of sources, including fossil fuels, nuclear power, and renewable sources such as hydroelectric, solar power, wind power and other sources. The electricity may then be stored on board the vehicle using a battery, a flywheel, a capacitor, a supercapacitor or other storage device. This is in contrast to traditional vehicles with combustion engines which derive energy from non-renewable fossil fuels. A key advantage of hybrid or electric vehicles is regenerative braking, which is the capability to recover energy normally lost during braking as electricity. The electricity recovered during braking is typically stored in the on-board battery.

A rechargeable battery, storage battery, secondary cell, or accumulator is a type of electrical battery which can be charged, discharged into a load, and recharged many times. A non-rechargeable or primary battery is supplied fully charged, and discarded once discharged. A rechargeable battery has one or more electrochemical cells (hereinafter "cell"). A rechargeable battery may be referred to as an "accumulator", as it accumulates and stores energy through a reversible electrochemical reaction. Rechargeable batteries are produced in many different shapes and sizes, ranging from button cells to megawatt systems connected to stabilize an electrical distribution network. Several different combinations of electrode materials and electrolytes may be used in the rechargeable battery, including lead-acid, nickel cadmium (NiCd), nickel metal hydride (NiMH), lithium ion (Li-ion), and lithium ion polymer (Li-ion polymer).

Electric vehicles store chemical energy in a rechargeable battery pack. Electric vehicles use electric motors and motor controllers rather than internal combustion engines for propulsion. Electric vehicles may be a battery only electric vehicle, otherwise known as an all-electric vehicle, or may be a hybrid vehicle which uses a combination of an electric motor and an internal combustion engine. Hybrid vehicles have a battery that may be externally recharged or may have a battery that is internally recharged with power from an internal combustion engine power and gasoline fuel. Hybrid vehicles run as battery electric vehicles during their charge-depleting mode.

Rechargeable batteries may be used to power an electric vehicle, an automobile starter, a portable consumer device, a light vehicle (such as a lawn mower, a golf cart, a motorized wheelchair, an electric bicycle, and an electric forklift), a tool, or an uninterruptible power supply. Small rechargeable batteries may be used to power portable electronic devices, power tools, appliances, and other devices. Heavy-duty rechargeable batteries may be used to power electric vehicles, such as scooters, locomotives and ships.

During charging of rechargeable batteries, the positive active material is oxidized, producing electrons, and the negative material is reduced, consuming electrons. The electrons constitute the current flow in an external circuit. An electrolyte may serve as a simple buffer for internal ion flow between a positive electrode and a negative electrode in lithium-ion and nickel-cadmium cells of the rechargeable battery. Alternatively the electrolyte may be an active participant in an electrochemical reaction, as in lead-acid cells.

The energy used to charge rechargeable batteries usually comes from a battery charger using alternating current (hereinafter "AC") electricity, although some are equipped to use a vehicle's 12-volt direct current (hereinafter "DC") power outlet. To store energy in a rechargeable battery, the rechargeable battery is connected to a DC voltage source. The negative terminal of the rechargeable battery is connected to the negative terminal of the DC voltage source and the positive terminal of the rechargeable battery is connected to the positive terminal of the DC voltage source. In addition, the voltage output of the DC voltage source must be higher than that of the battery, but not much higher: the greater the difference between the DC voltage source and the battery's voltage capacity, the faster the charging process, but also the greater the risk of overcharging and possible damage to the rechargeable battery.

Charging the rechargeable battery may range in time from a few minutes to several hours. Slow "dumb" chargers without voltage or temperature-sensing capabilities will charge at a low rate, typically taking 14 hours or more to reach a full charge. Rapid chargers can typically charge cells in two to five hours. Depending on the model, rapid chargers can take as little as fifteen minutes. Fast chargers must have multiple ways of detecting when an electrochemical cell (hereinafter "cell") in the rechargeable battery reaches full charge (change in terminal voltage, temperature, etc.) in order to stop charging before overcharging or overheating occurs. Overcharging or overheating of the rechargeable battery can damage the rechargeable battery. The fastest chargers may incorporate cooling fans to keep the cells from overheating.

A battery charge and discharge rate can be referred to as a "C" rate. The C rate is the amount of current required to theoretically complete a charge cycle in one hour. A charge cycle may include either fully charging or fully discharging a rechargeable battery. For example, a typical charge cycle may be performed at a C/2 rate in which the charge current is reduced such that the charge cycle is 2 hours. Alternatively, a trickle charge cycle may be performed at a C/20 rate in which the charge current is reduced such that the charge cycle is 20 hrs. The available capacity of cells varies depending on a discharge rate. Some energy is lost in the internal resistance of cell components, and the rate of discharge is limited by the speed at which chemicals in the cell can move about. Cell components may include plates, an electrolyte, and interconnections.

In a primary battery, or a non-rechargeable battery, the positive and negative electrodes are known as the cathode and anode, respectively. Although this convention is sometimes carried through to rechargeable batteries, especially with lithium-ion rechargeable batteries, because of their origin in primary batteries, this practice can lead to confusion. In a rechargeable battery the positive electrode is the cathode during discharging and the anode during charging. The negative electrode is the anode during discharging and the cathode during charging.

The present invention generally relates to an electric vehicle charging station and more particularly to a method of self-aligning a charging coupler from the electric vehicle charging station to a receptacle in the electric vehicle in order to charge a battery in the electric vehicle. An example of an electric vehicle automatic battery charging station may include a charging coupler which automatically self-aligns with a receptacle on the underside of an electric vehicle.

An embodiment of the electric vehicle automatic charging station is described in detail below by referring to the accompanying drawings in FIGS. 1 to 12, in accordance with an illustrative embodiment.

Figure 1:
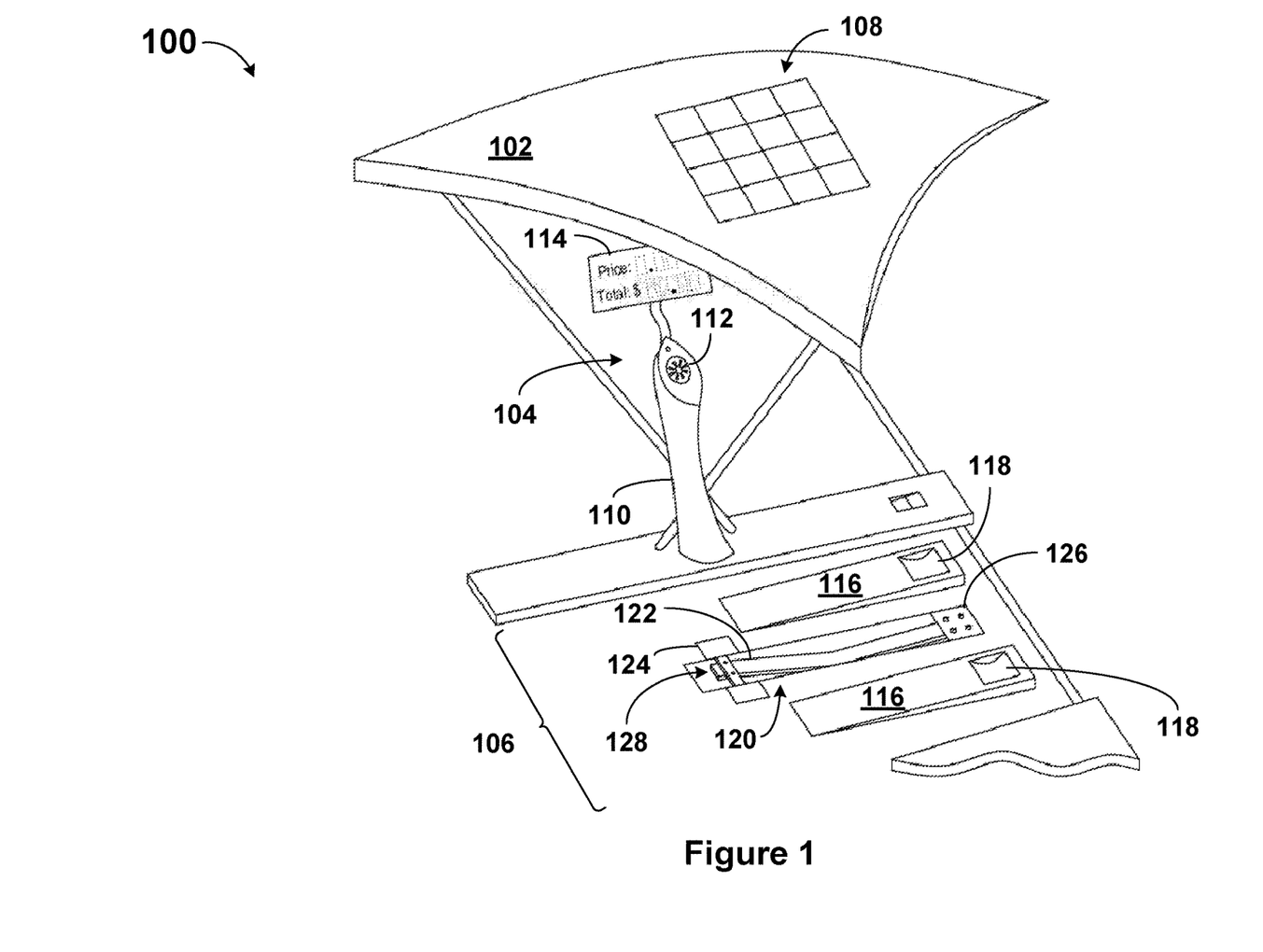
FIG. 1 is an isometric view of a self-aligning charging station structure according to an exemplary embodiment.

Referring to FIG. 1, an automatic charging station 100 is shown according to an exemplary embodiment. The automatic charging station 100 may include a canopy 102, a terminal 104, and a parking lane 106. The canopy 102 may be cantilevered with supports on one side of the parking lane 106, as illustrated. Alternatively, in an embodiment, the canopy 102 may be supported on two or more sides of the parking lane 106; however, the supports may preferably not interfere with parking a vehicle in the parking lane 106. The canopy 102 may be made from either rigid or flexible materials, such as, for example, conventional roofing materials or canvas. The canopy 102 may preferably shade and provide some protection to the terminal 104, the parking lane 106 and an electric vehicle parked in the parking lane 106, from environmental elements, such as, for example, temperature, sun, wind, rain, or snow. It should be noted that in some embodiments the canopy 102 can be omitted. In an embodiment, the canopy 102 may include a photovoltaic cell or solar panel 108, which may be used to power the terminal 104 and other accessories related to the automatic charging station 100.

The terminal 104 may include a stand 110, an interface 112 and a display screen 114. The terminal 104 may be mounted adjacent to the parking lane 106 and may be positioned such that an operator of an electric vehicle may access the interface 112 and preferably see the display screen 114 while remaining seated in the electric vehicle. Even with the presence of the canopy 102, the terminal 104 should be robust for an outdoor environment and be able to withstand environment elements such as temperature, sun, wind, rain and snow. The terminal 104 may be constructed from high impact, chemically resistant and ultraviolet resistant housing. Ideally, the terminal 104 can withstand dust and liquid. It should be noted that in an embodiment the terminal 104 may be located at a distance away from the parking lane 106 and in this case the operator may not access the terminal 104 while seated in the electric vehicle.

The parking lane 106 may include an alignment mechanism 116, a sensor 118, a coupler assembly well 128, and a coupler assembly 120. The parking lane 106 may be sized to fit a variety of electric vehicles, such as an automobile, a lawn mower or a golf cart, among other vehicles.

The alignment mechanism 116 may provide a physical locator for an operator of the electric vehicle to drive into the parking lane 106, such that the vehicle is properly positioned in the parking lane 106 to facilitate charging. The alignment mechanism 116 may include a visual indicator such as painted line or physical wheel alignments to identify a boundary of the parking lane to an operator of the electric vehicle and ensure alignment of the electric vehicle in the parking lane. The alignment mechanism 116 may include optic, photo, laser or an electrometrical alignment. The sensor 118 may trigger the terminal 104 to turn on when an electric vehicle has entered the parking lane 106. The sensor 118 may be a pressure sensor, an optical sensor, a motion sensor, a laser sensor, an electromechanical sensor, among other types. In an embodiment, the sensor 118 may be a laser sensor which senses when the electric vehicle has entered the parking lane 106 and may turn on the terminal 104. The sensor 118 may assist an operator during parking by indicating a direction to assist with alignment in the parking lane 106.

The coupler assembly well 128 may be recessed in the ground such that it may be positioned beneath the electric vehicle. The coupler assembly well 128 may be an opening of sufficient size to accommodate the coupler assembly 120. The coupler assembly well 128 may have a retractable cover (not shown) that may protect the coupler assembly 120 from weather elements and may also withstand the weight of an electric vehicle driving over the cover.

The coupler assembly 120 may include an arm 122, an arm base 124, and a charging coupler 126. The arm 122 may be a robotic arm, a hydraulic arm, or another type of support that can hold the charging coupler 126 and control a movement of the charging coupler 126 to a position suitable for charging the electric vehicle.

A first end of the arm 122 may be pivotally mounted to the ground via the arm base 124 at a first end of the coupler assembly well 128. The charging coupler 126 may be attached to a second end of the arm 122. The second end of the arm 122 and the charging coupler 126 may be moveable below ground into the coupler assembly well 128 and may be movable to an above ground position when the electric vehicle is parked in the parking lane 106 and ready for charging. In an embodiment, the operator of the electric vehicle will initiate charging of the electric vehicle using the terminal 104. In an alternate embodiment, charging may be initiated automatically in response to the presence of the electric vehicle in the parking lane 106 without any action from the operator.

In an embodiment, a cleaning device may be present (not shown) which can clean the charging coupler 126 and may also clean a receptacle in the electric car, prior to charging, in order to insure a good electrical connection between the charging coupler 126 and the receptacle. In an additional embodiment, a fan may be used to help control an elevated temperature of the charging coupler 126. The cleaning device may be a brush, or a rotating brush.

The terminal 104 may control the operation of the retractable cover, the coupler assembly 120, the cleaning device, and the fan.

The terminal 104 may have a communication device and may receive vehicle information for purposes of selecting an appropriate charge cycle based on an electric vehicle type and battery type, among other information. The terminal 104 may receive operator information for purposes of payment for charging. The vehicle information and the operator information may be automatically sent to the terminal 104, or the vehicle information and the operator information may be manually entered into the interface 112. Automatic loading to the terminal 104 of the vehicle information and the operator information may be performed if the electric vehicle or the operator has a communication device. Communication devices may communicate with the terminal 104 via infrared, Wi-Fi, Radio-Frequency Identification (hereinafter referred to as "RFID"), Bluetooth, or other communication methods. An example of a communication device is an electronic key fob. The electronic key fob may have an RFID tag.

The terminal 104 may have an RFID reader. The electric vehicle or the operator may have a RFID tag. RFID is the wireless use of electromagnetic fields to transfer data. The data may contain information to automatically identify and track a RFID tag attached to an object. The RFID tag may be attached to the electric vehicle or the operator may have a communication device containing the RFID tag. The RFID tag contains electronically stored information. The terminal 104 may have a two-way radio transmitter-receivers. The two-way radio transmitter-receiver may be called an interrogators or readers, and may send a signal to the RFID tag and read a response from the RFID tag. The RFID tag may be passive, active or battery-assisted passive. An active tag has an on-board battery and periodically transmits its identification signal. A battery-assisted passive tag has a small battery on board and is activated when in the presence of an RFID reader. A passive tag is cheaper and smaller and does not contain a battery. The passive tag uses the radio energy transmitted by the reader. To operate a passive tag, it must be illuminated with a power level roughly a thousand times stronger than for signal transmission. The high power level increases interference and radiation exposure.

The RFID reader transmits an encoded radio signal to interrogate the RFID tag. The RFID tag receives the message and responds with identification and other information. The identification received from the tag may include a unique tag serial number, vehicle information regarding the electric vehicle, information regarding the electric vehicle operator, and other information. Vehicle information may include an electric vehicle manufacturer, an electric vehicle model number, an electric vehicle battery manufacturer, an electric vehicle battery model number, an installation date of the electric vehicle battery, a physical location of an electric vehicle charger connector, electric vehicle battery charge information, and other information. The electric vehicle battery charge information may include charge voltage, charge current and charge duration. The operator information may include an operator name, an operator credit card information, among other information.

Figure 2:
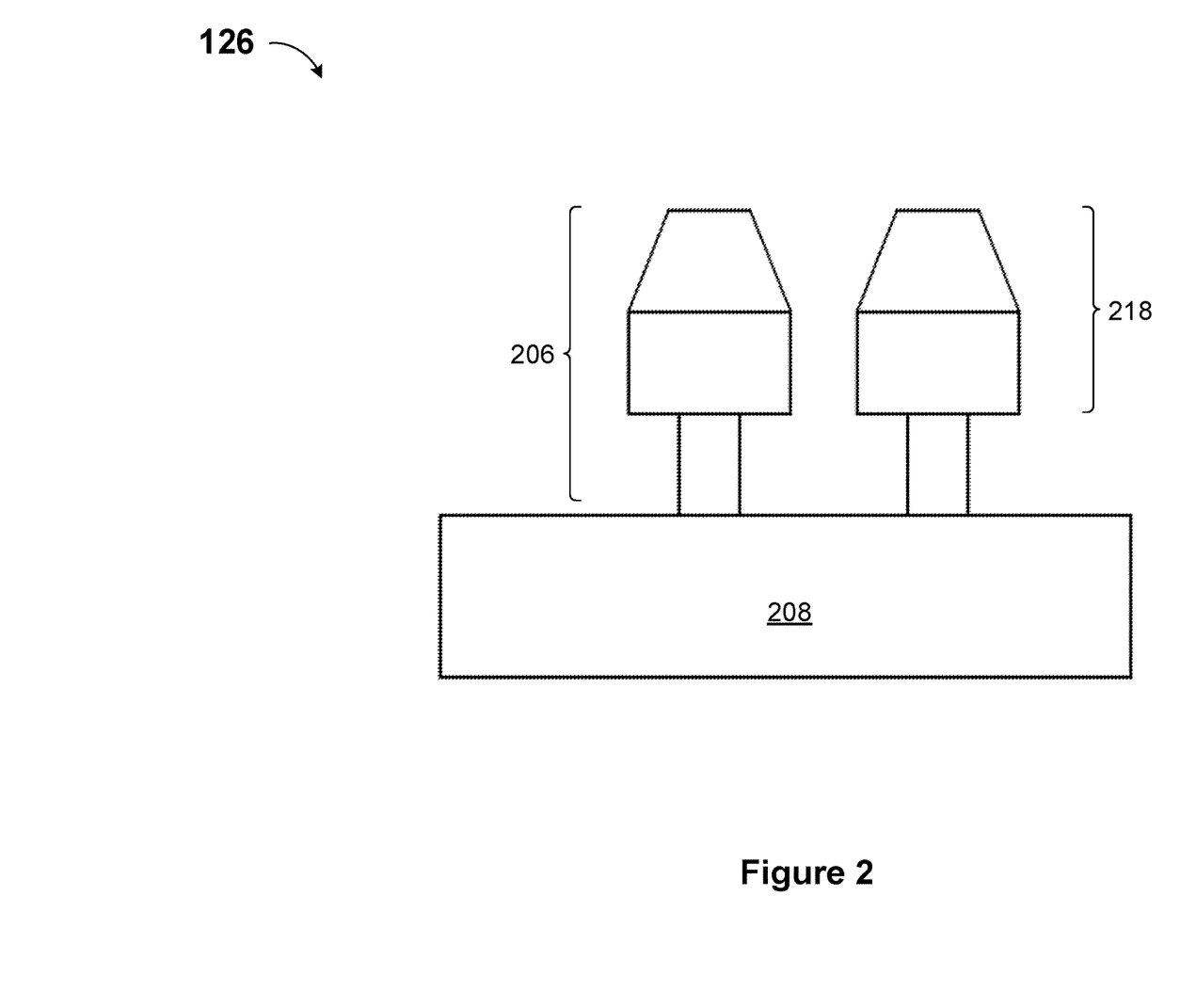
FIG. 2 is a front view of a charging coupler according to an exemplary embodiment.
Figure 3:
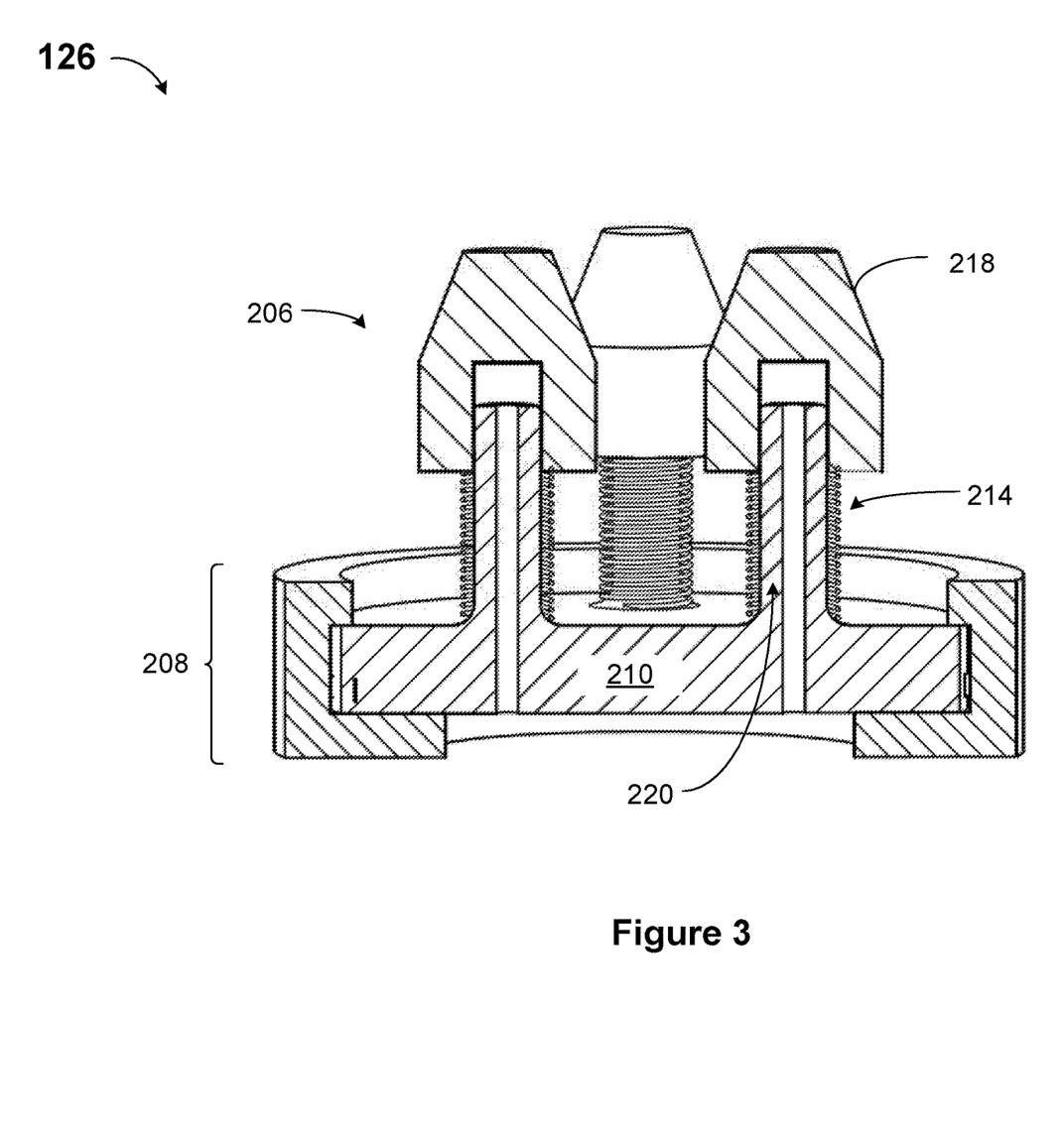
FIG. 3 is a cross section view of a charging coupler according to an exemplary embodiment.
Figure 4:
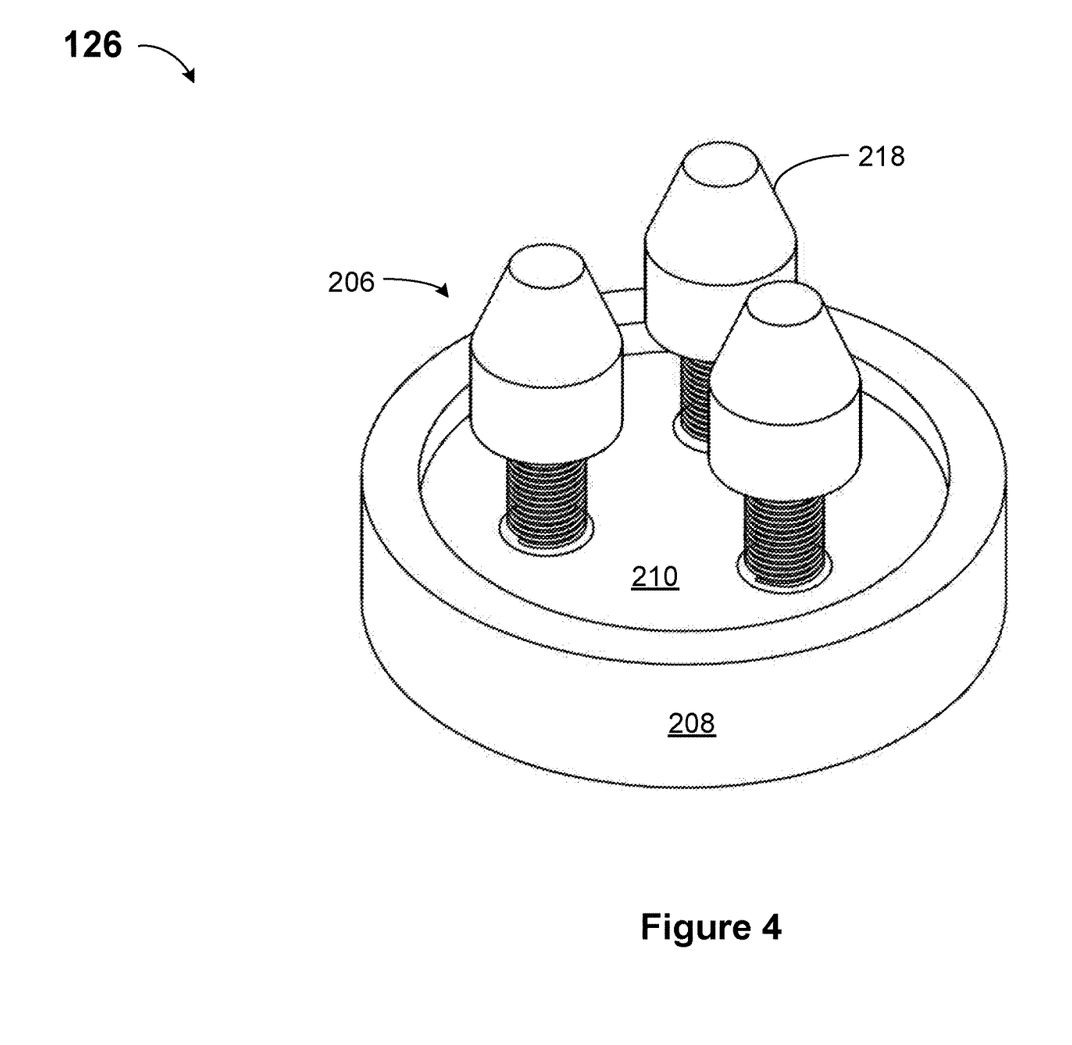
FIG. 4 is an isometric view of a charging coupler according to an exemplary embodiment.
Figure 5:
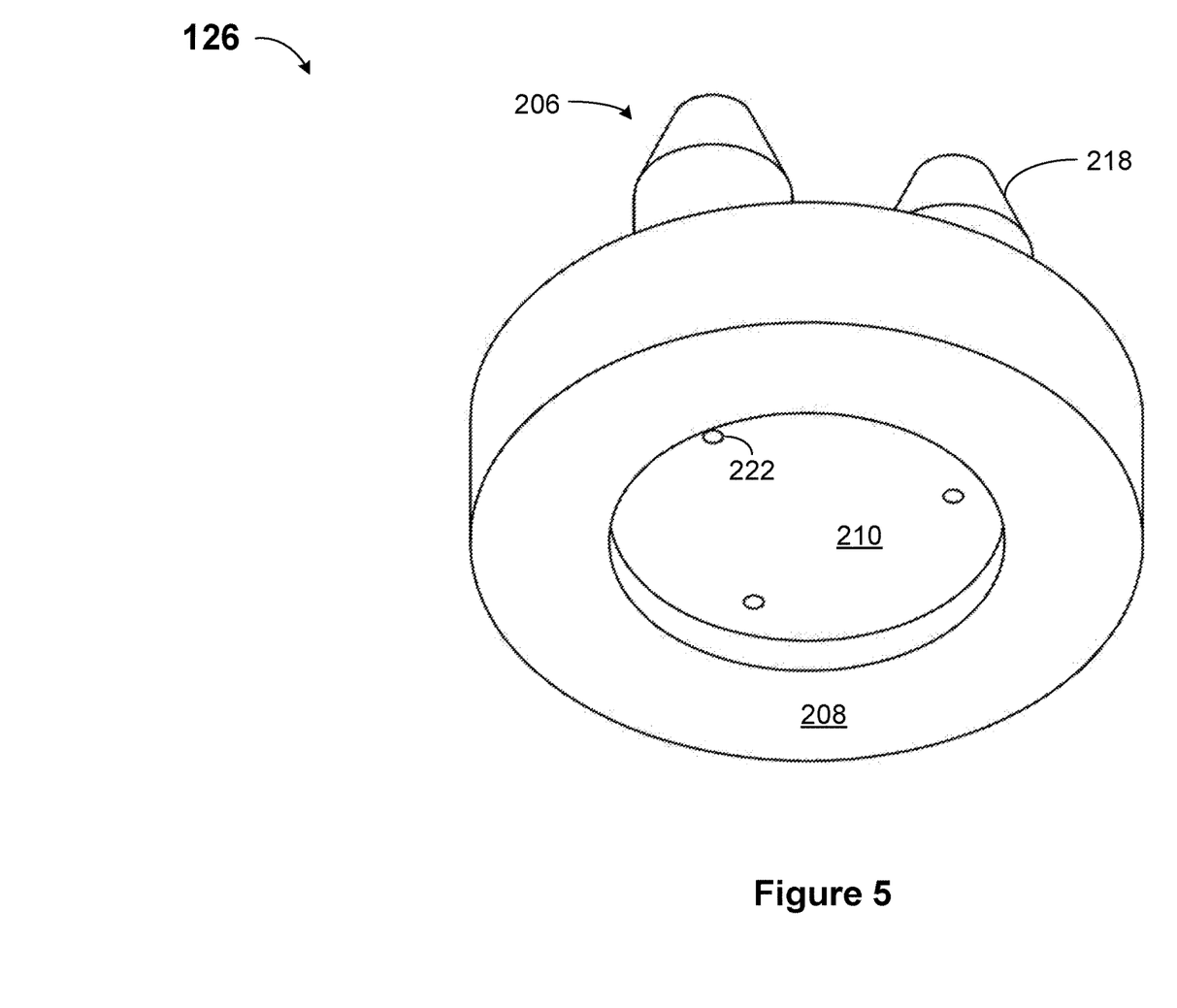
FIG. 5 is an isometric view of a charging coupler according to an exemplary embodiment.
Figure 6:
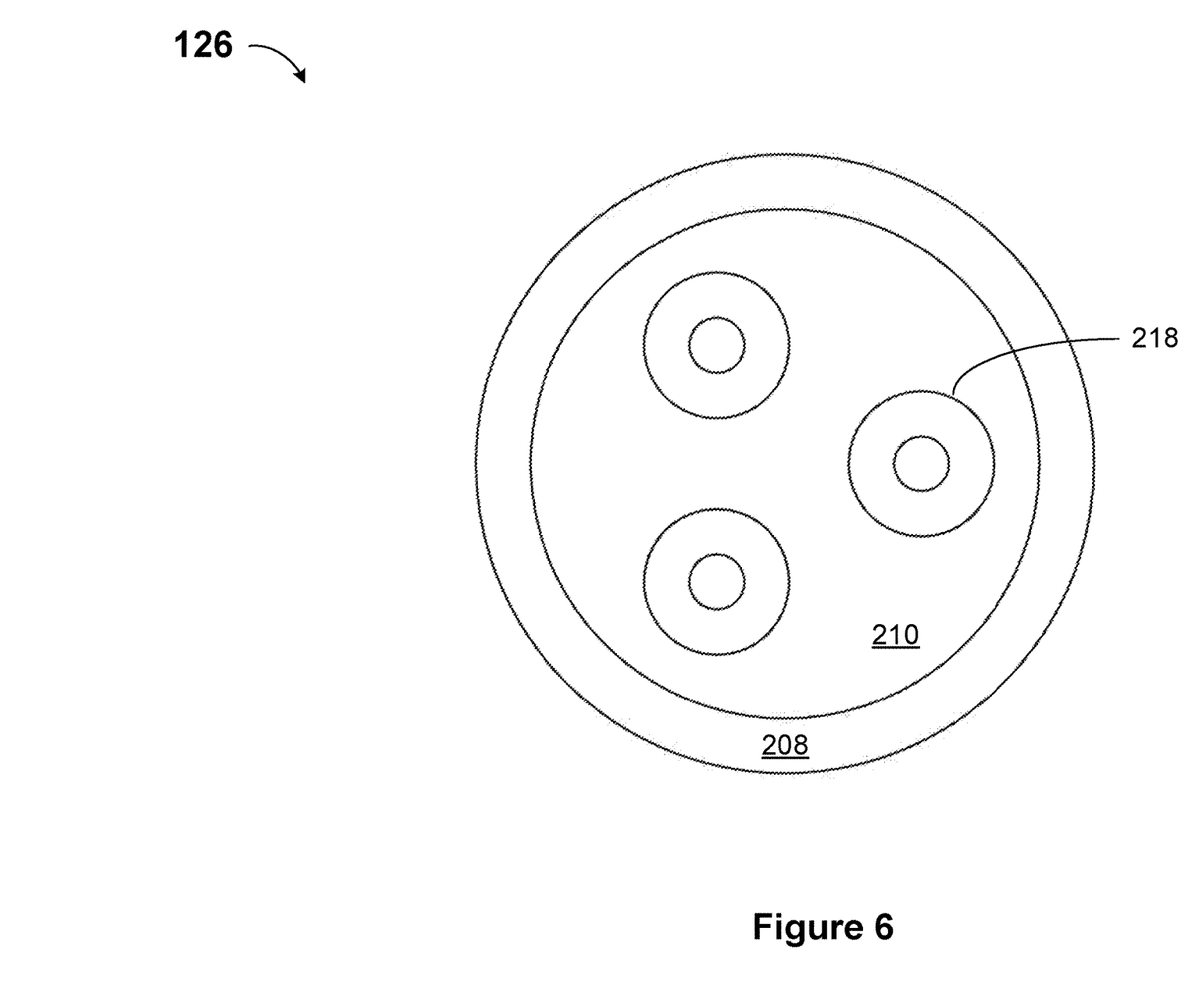
FIG. 6 is a top view of a charging coupler according to an exemplary embodiment.

Referring to FIGS. 2 through 6, the charging coupler 126 is shown according to an exemplary embodiment. FIG. 2 is a front view of the charging coupler 126. FIG. 3 is a cross section view of the charging coupler 126. FIGS. 4 and 5 are isometric views and FIG. 6 is a top view.

It should be noted that the charging coupler 126 is a component of the coupler assembly 120 located in the parking lane 106.

The charging coupler 126 may include a charging protrusion 206, a charging coupler housing 208, a main slide 210, a tension spring 214, and a charging contact 218. It should be noted that, while the embodiment depicted in the figures includes three charging protrusions 206, three tension springs 214, and three charging contacts 218, any number of these components may be formed on the charging coupler 126. There should be the same number of charging protrusions 206, tension springs 214 and charging contacts 218 in the charging coupler 126.

The charging coupler 126 should have an insulating material between the one or more charging protrusions 206 such that there is no electrical contact between the one or more charging protrusions 206. The charging coupler 126 should be made of materials resistant to environmental elements.

The main slide 210 may have a protrusion mount 220. The main slide 210 is mounted directed on the charging coupler housing 208 and is held in place by one or more spring clips. In an embodiment, the protrusion mount 220 is cylinder shaped and the tension spring 214 covers the protrusion mount 220 concentrically. The charging contact 218 is attached to the tops of and may partially cover the protrusion mount 220 and the tension spring 214. The charging contact 218 may be fabricated of a conductive material, such as copper, stainless steel, aluminum, an alloy, copper plated steel or other conductive metal or alloy. The charging contact 218 may be able to move laterally relative to the charging coupler 126 due to the tension spring 214. This lateral movement may assist in the electrical connection between the charging coupler 126 and the receptacle 202 during battery charging. In an embodiment, the charging contact 218 may have a lower portion which is cylinder shaped which partially covers the protrusion mount 220, the insulator 216 and the tension spring 214. The charging contact 218 may have an upper portion which is essentially cone shaped with a flattened portion on a top side of the charging contact 218. This shape can be referred to as a right conical frustum extending from the charging coupler.

The tension spring 214 may be made of a spring steel material such as annealed steal hardened after fabrication, phosphor bronze and titanium, or other appropriate material.

The charging coupler 126 may have a conductive wire 222 through the charging contact 218, and the protrusion mount 220, connecting a bottom of the charging coupler 126 electrically to the charging contact 218. The conductive wire 222 may be fabricated of a conductive material, such as copper, stainless steel, aluminum, an alloy, copper plated steel or other conductive metal or alloy.

Figure 7:
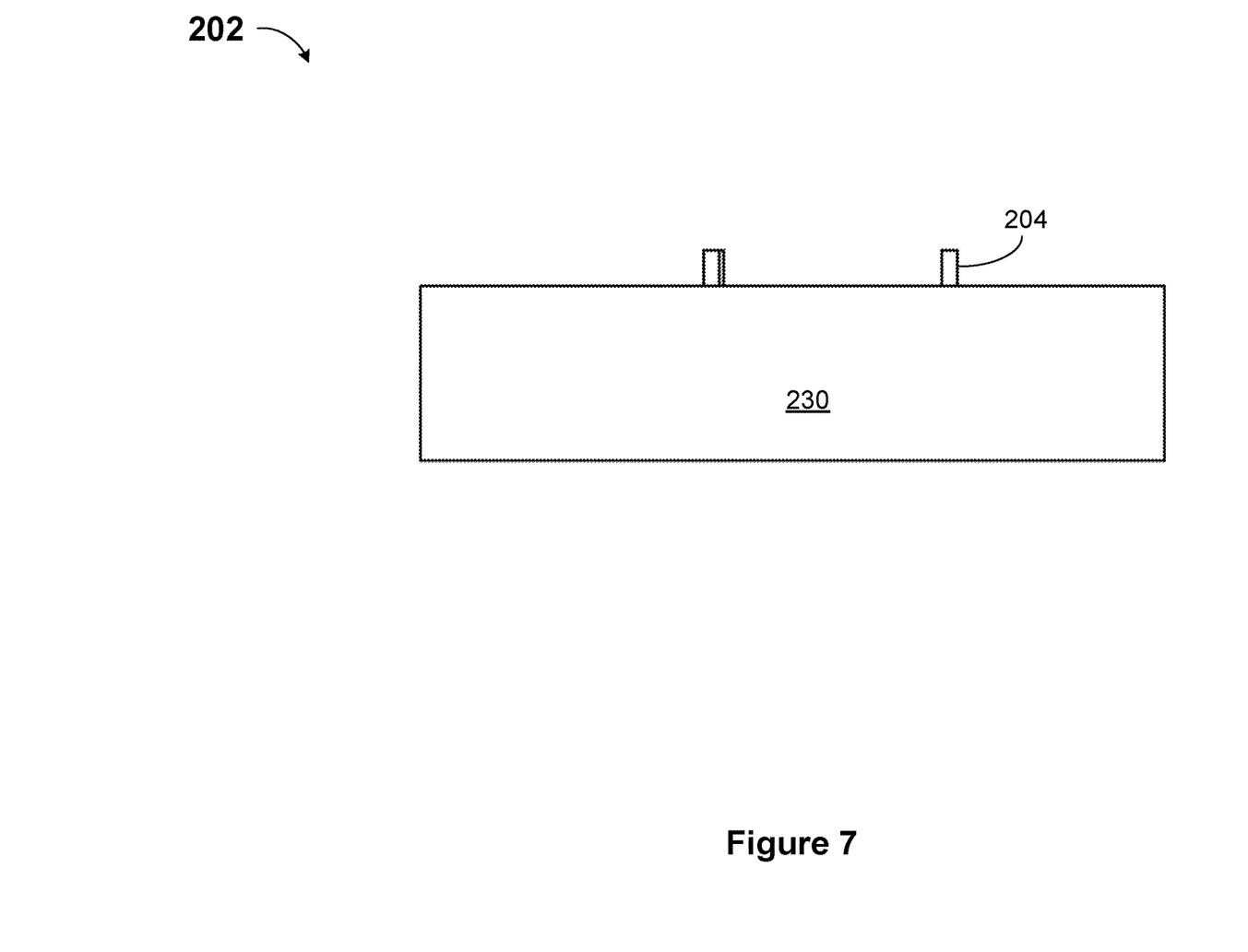
FIG. 7 is a front view of a receptacle according to an exemplary embodiment.
Figure 8:
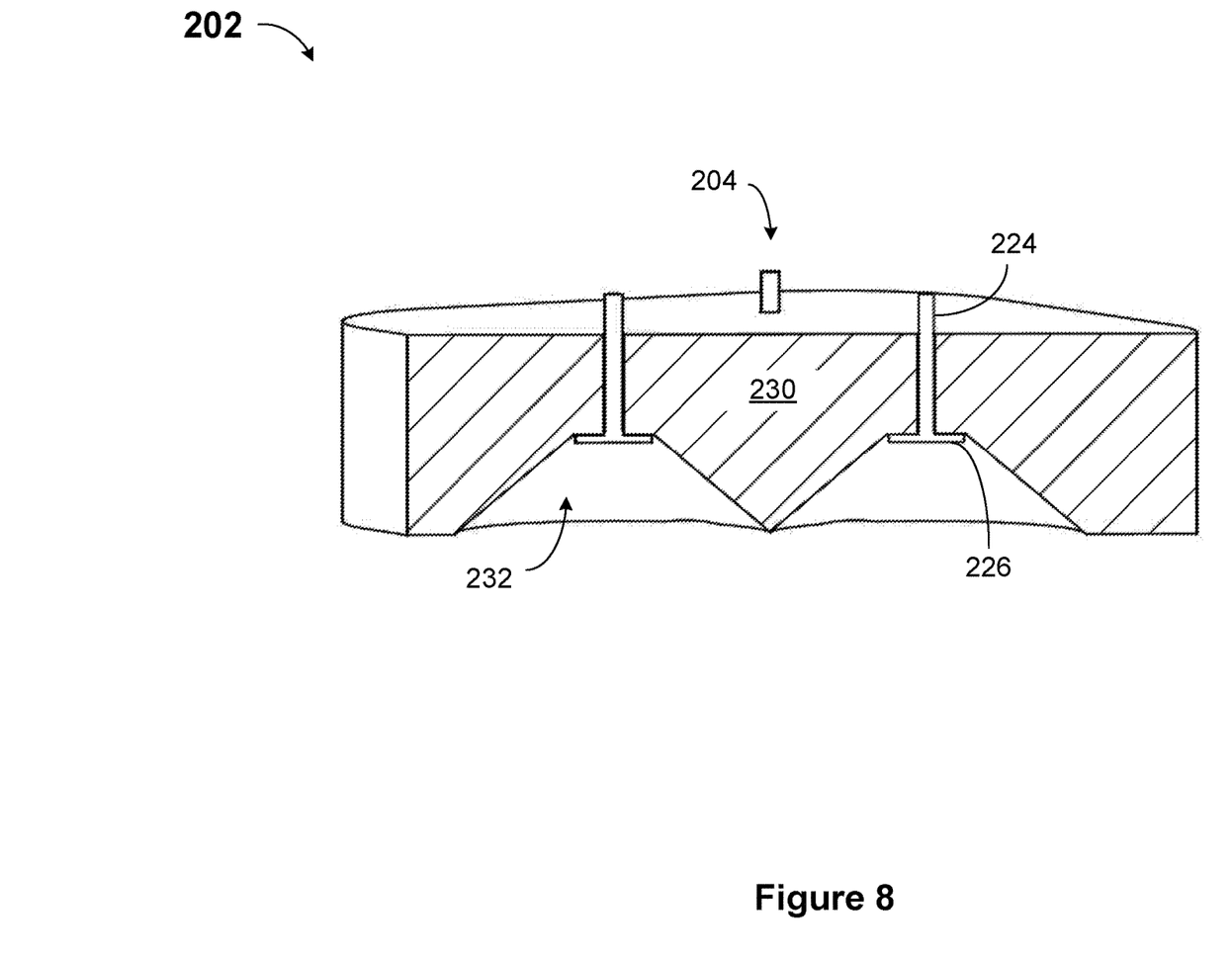
FIG. 8 is a cross section view of a receptacle according to an exemplary embodiment.
Figure 9:
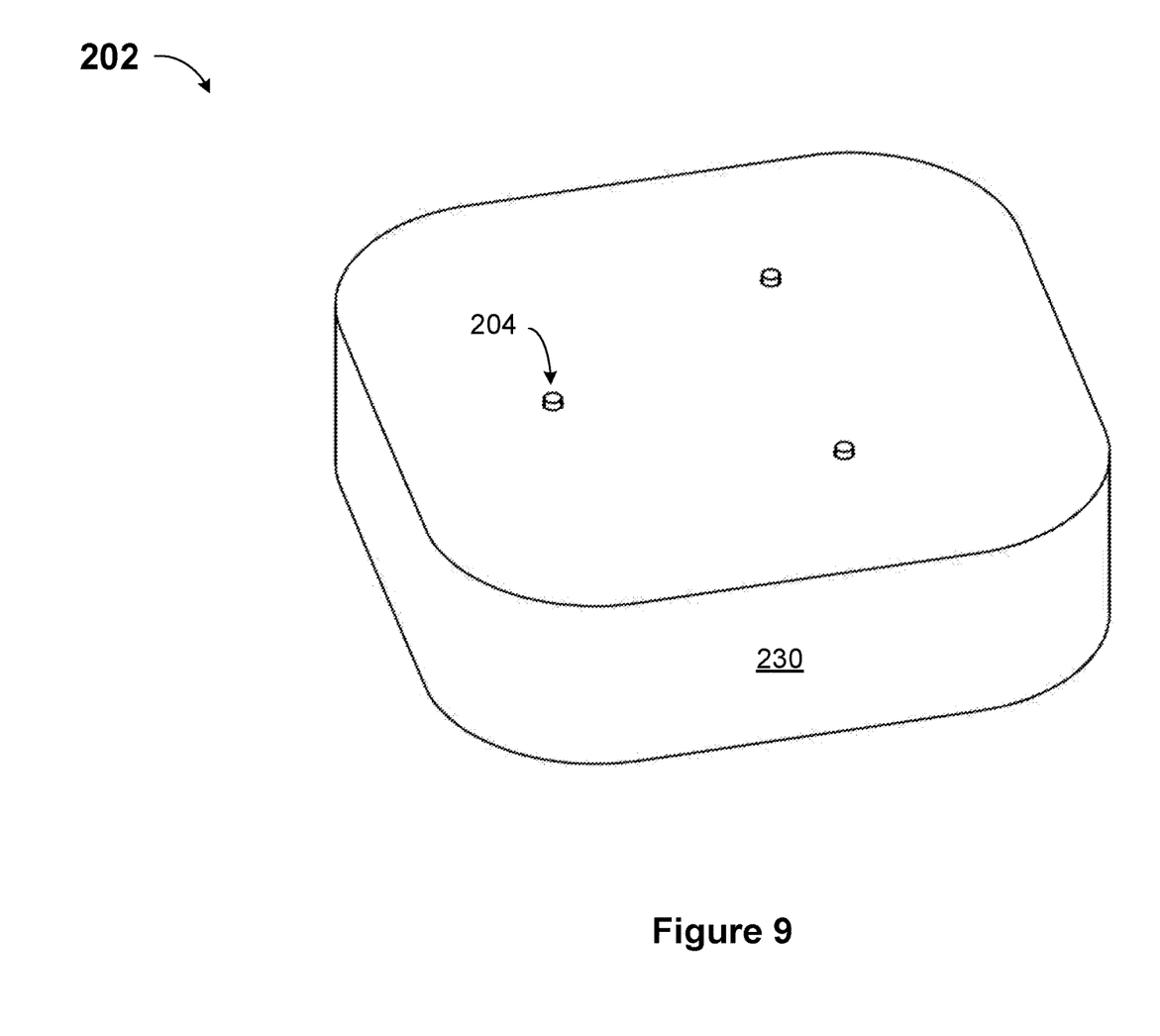
FIG. 9 is an isometric view of a receptacle according to an exemplary embodiment.
Figure 10:
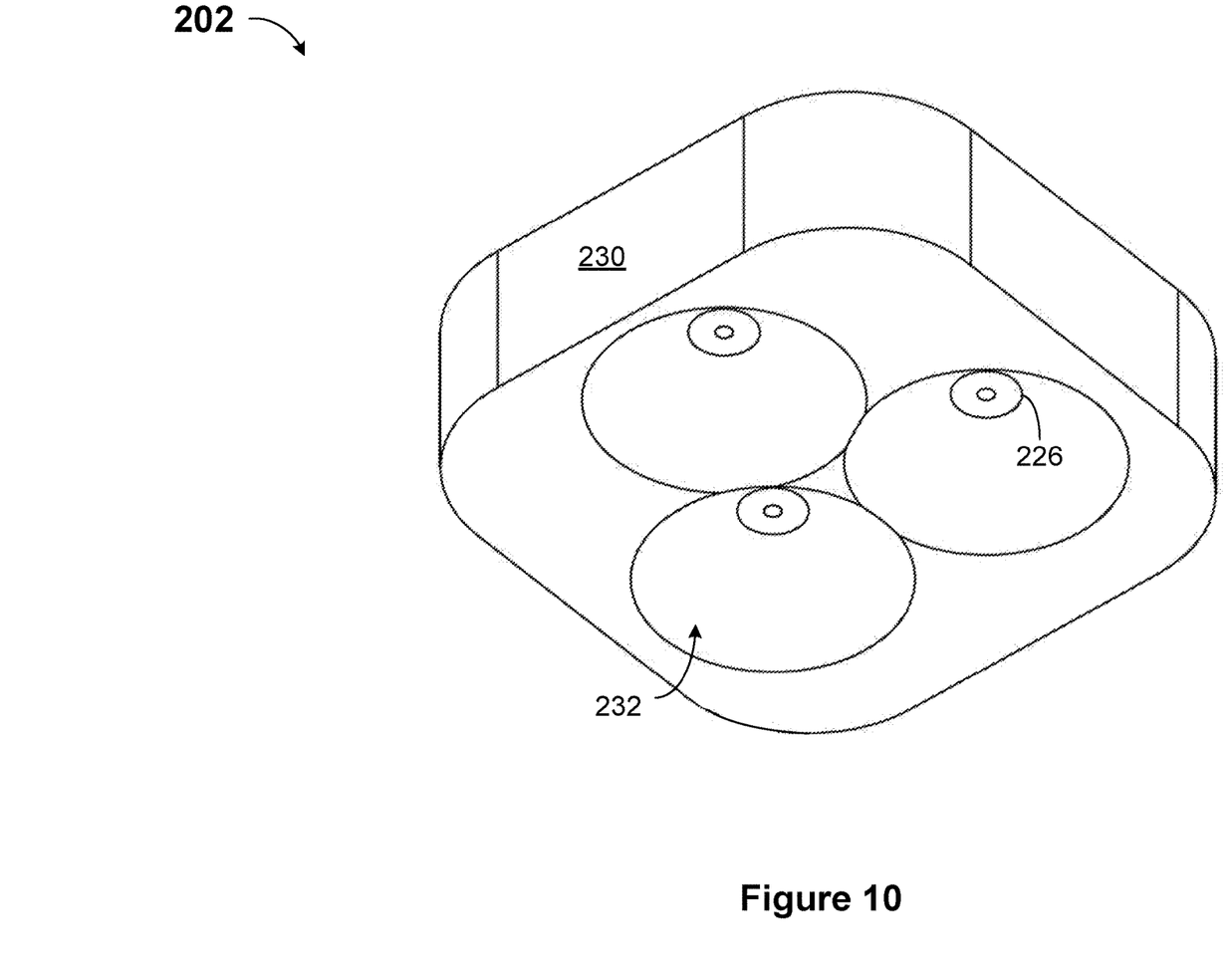
FIG. 10 is an isometric view of a receptacle according to an exemplary embodiment.
Figure 11:
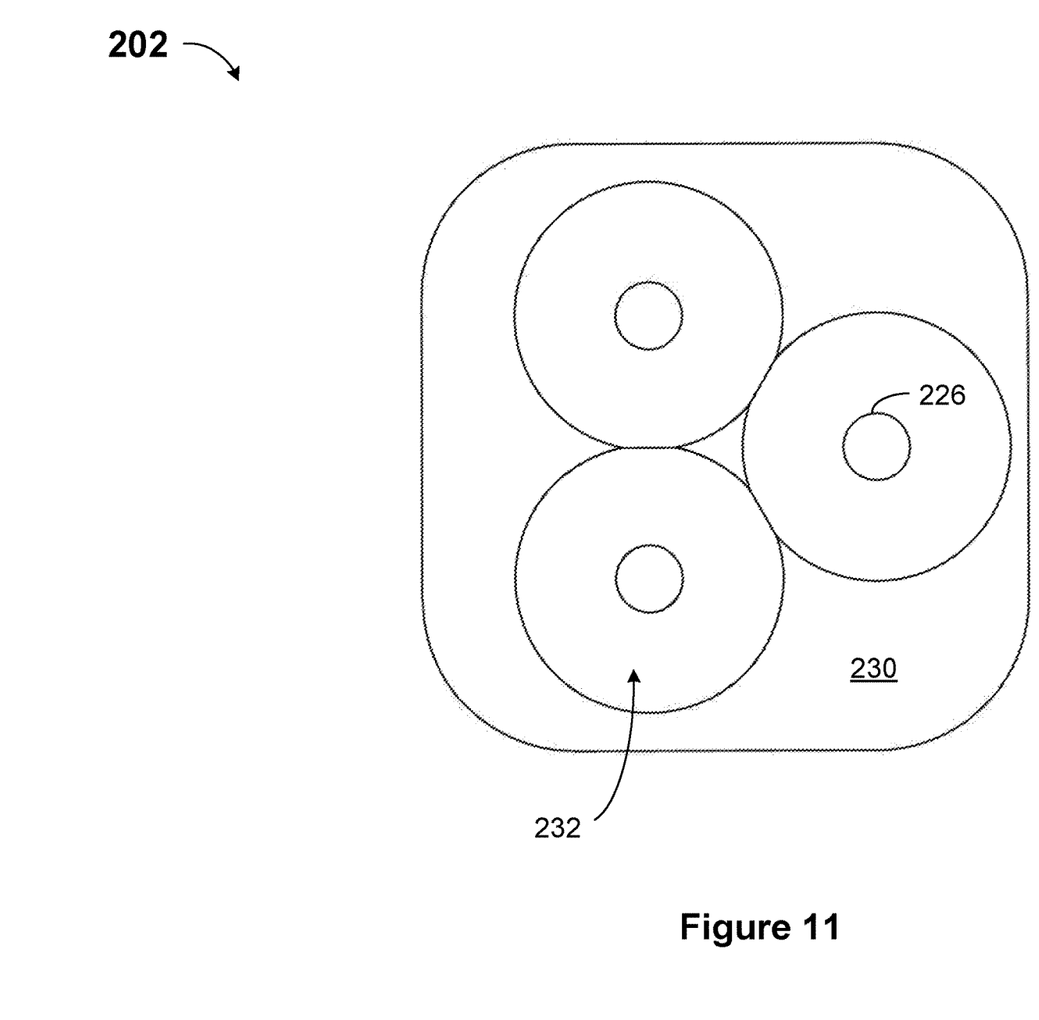
FIG. 11 is a bottom view of a receptacle according to an exemplary embodiment.

Referring to FIGS. 7 through 11, a receptacle 202 is shown according to an exemplary embodiment. FIG. 7 is a front view of the receptacle 202. FIG. 8 is a cross section view. FIGS. 9 and 10 are isometric views. FIG. 11 is a bottom view.

It should be noted that the receptacle 202 may be attached to the electric vehicle and may be accessible from the bottom of the electric vehicle. The receptacle 202 may be connected to the electric vehicle battery and be used to re-charge the battery.

The receptacle 202 may include a receptacle housing 230, a receptacle contact 204 and a receptacle well 232. The receptacle 202 should be made of materials resistant to environmental elements. It should be noted that, while the embodiment depicted in the figures includes three receptacle contacts 204 and three receptacle wells 232, any number of these components may be formed on the receptacle 202. There should be the same number of receptacle contacts 204 and receptacle wells 232 in the receptacle housing 230.

The number of receptacle contacts 204 and receptacle wells 232 in the receptacle 202 should be the same number of charging protrusions 206, tension springs 214, and charging contacts 218 in the charging coupler 126.

The receptacle housing 230 should have an insulating material between the one or more receptacle contacts 204 and between the one or more receptacle wells 232 such that there is no electrical contact between them. The receptacle 202 should be made of materials resistant to environmental elements.

The receptacle contact 204 may consist of two parts. A first part of the receptacle contact 204 may be a receptacle wire 224 and a second part of the receptacle contact 204 may be a flat concentric circle 226. The receptacle wire 224 may extend through the receptacle 202 and protrude above the receptacle 202. The flat concentric circle 226 may be at a top of the receptacle well 232. The receptacle wire 224 and the flat concentric circle 226 may be fabricated of a conductive material, such as copper, stainless steel, aluminum, an alloy, copper plated steel or other conductive metal or alloy. The receptacle wire 224 may be connected in the electric vehicle to the battery and may be used to charge the battery.

The receptacle well 232 may be cone shaped with a larger portion of the cone shape present at an open exposed bottom of the receptacle 202.

The receptacle well 232 may provide an opening such that when the charging coupler 126 is raised for battery charging, the charging protrusion 206 may be aligned and fit into the receptacle well 232. The charging contact 218 may make an electrical connection with the receptacle contact 204 at the point of the flat concentric circle 226. The one or more charging protrusions 206 should be aligned with the one or more receptacle contacts 204.

Figure 12:
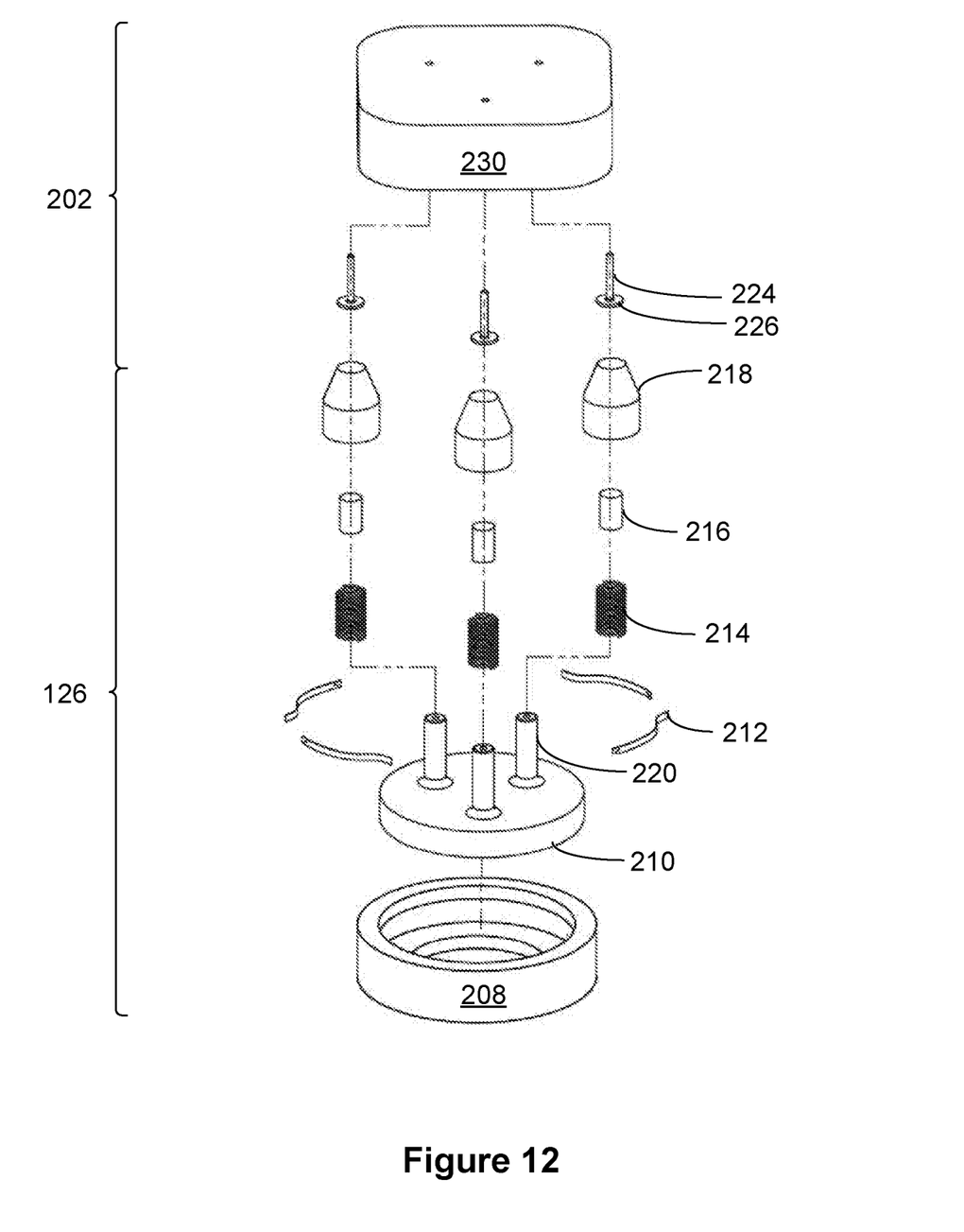
FIG. 12 is an exploded isometric view of a charging coupler and a receptacle according to an exemplary embodiment.

FIG. 12 is an exploded isometric view of the charging coupler 126 and the receptacle 202, according to an exemplary embodiment. Additional components shown in FIG. 12 include a spring clip 212 and an insulator 216 in the charging coupler 126. It should be noted that, while the embodiment depicted in the figures includes four spring clips 212, any number of these components may be formed on the charging coupler 126. As stated above, the main slide 210 is mounted directed on the charging coupler housing 208 and is held in place by the one or more spring clips 212. The spring clip 212 may be made of a spring steel material such as annealed steal hardened after fabrication, phosphor bronze and titanium, or other appropriate material.

The insulator 216 may form a layer between the protrusion mount 220 and the tension spring 214. The insulator 216 may be shaped cylindrically. The charging contact 218 is attached to the tops of and may partially cover the protrusion mount 220, the insulator 216 and the tension spring 214.

In an embodiment, the charging coupler 126 of may be a replaceable component and the receptacle 202 may be a second replaceable component. The charging coupler 126 and the receptacle 202 may be replaced at regular intervals, in order that both can provide a good electrical conduction.

The terminal 104 may control an automatic alignment of the charging coupler 126 to the receptacle 202. The automatic alignment may utilize the sensor 118, the alignment mechanism 116, the electric vehicle information, the operator information, or other methods to assist in the automatic alignment of the charging coupler 126 to the receptacle 202.

The electric vehicle automatic charging station has several advantages. The advantages include the vehicle operator may remaining in the electric vehicle during battery charging, there is a reduction of a risk of vehicle occupant inadvertently plugging in a power cord incorrectly with risk of personal injury, and easier use for operators who may be physically unable to plug in a power cord for traditional electric vehicle charging. In the future as electric vehicle battery charging times decrease, there may be further advantages to the use of the self-aligning electric vehicle charging station.

It may be noted that not all advantages of the present invention are include above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A structure comprising:
an alignment mechanism used to align an electric vehicle in a parking lane of an electric vehicle charging station;
a terminal comprising a display and an interface and a wireless communication device, the wireless communication device receives vehicle information, the vehicle information comprises charging parameters specific to the electric vehicle;
an electromagnetic sensor used to detect a presence of the electric vehicle in the parking lane and to activate the terminal to initiate charging of a battery in the electric vehicle;
a coupler assembly comprising an arm and a charging coupler located in the parking lane and positioned beneath the electric vehicle, the charging coupler is positioned at one end of the arm, and is moveable in a vertical direction relative to the parking lane, and another end of the arm is pivotally mounted in the parking lane, wherein the charging coupler comprises one or more electrical contacts in a shape of a right conical frustum extending from the charging coupler in the vertical direction, wherein each of the electrical contacts partially overlaps a circular protrusion mount, an insulator surrounding each of the protrusion mounts, and a compression spring surrounding each of the insulators, wherein the protrusion mount, the insulator and the compression spring are mounted on a main slide, wherein the main slide is mounted directly on the charging coupler and is held in place by one or more spring clips, wherein the charging coupler is removably mounted to the coupler assembly and is replaceable when worn out,
wherein a receptacle housing of the battery in the electric vehicle aligns with the coupler assembly when the electric vehicle is in the parking lane, wherein the receptacle housing is removably mounted and is replaceable when worn out; and
a cleaning device for cleaning a corresponding receptacle of the electric vehicle, wherein the receptacle aligns with the coupler assemble.

2. The structure according to claim 1, wherein the alignment mechanism comprises a visual indicator to identify a boundary of the parking lane to an operator of the electric vehicle and ensure alignment of the electric vehicle in the parking lane.

3. The structure according to claim 1, wherein the alignment mechanism comprises an optical sensor and an alignment indicator, wherein the optical sensor detects a position of the electric vehicle in the parking lane and the alignment indicator is coupled to the optical sensor and indicates an alignment of the electric vehicle based on its position to an operator of the electric vehicle.

4. The structure according to claim 1, wherein the coupler assembly is movable in a horizontal direction relative to the parking lane.

5. The structure according to claim 1, wherein the wireless communication device comprises a Radio-Frequency Identification (hereinafter referred to as "RFID") reader.

* * * * *